March 7, 1950 — T. G. LINDERME — 2,499,657
DRILL HEAD
Filed May 26, 1947 — 2 Sheets-Sheet 1
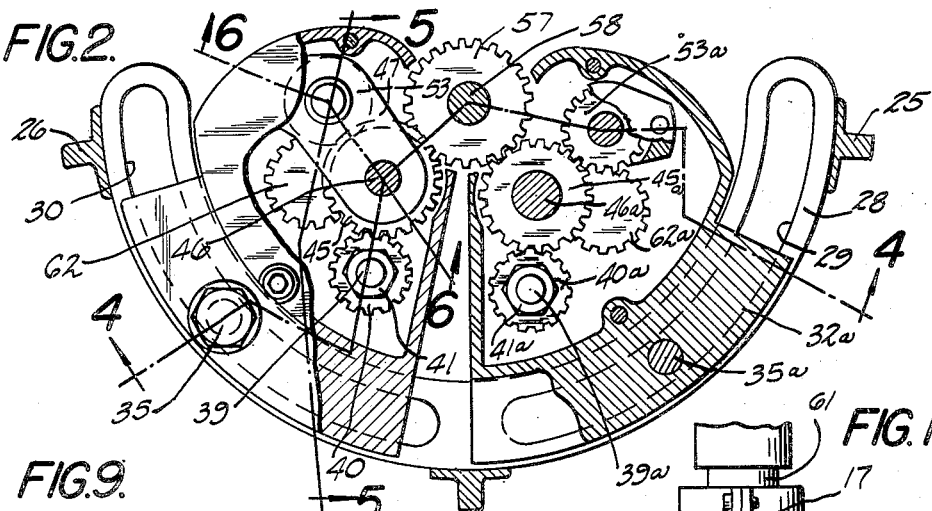
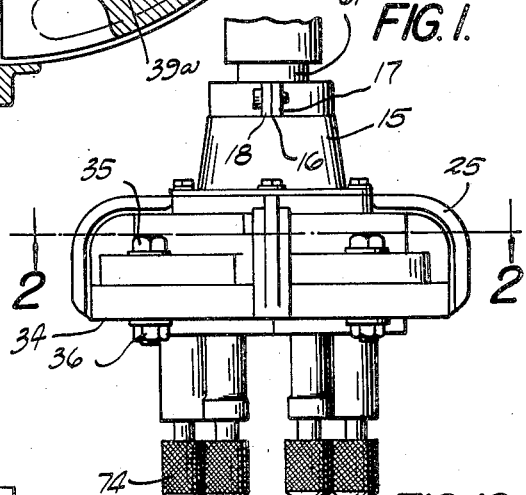
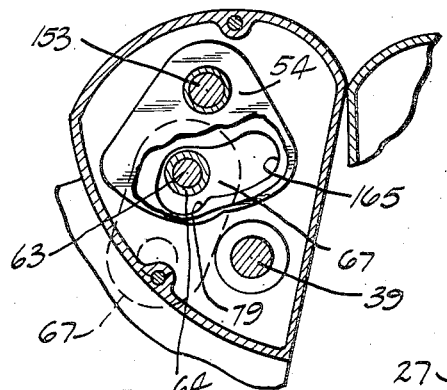
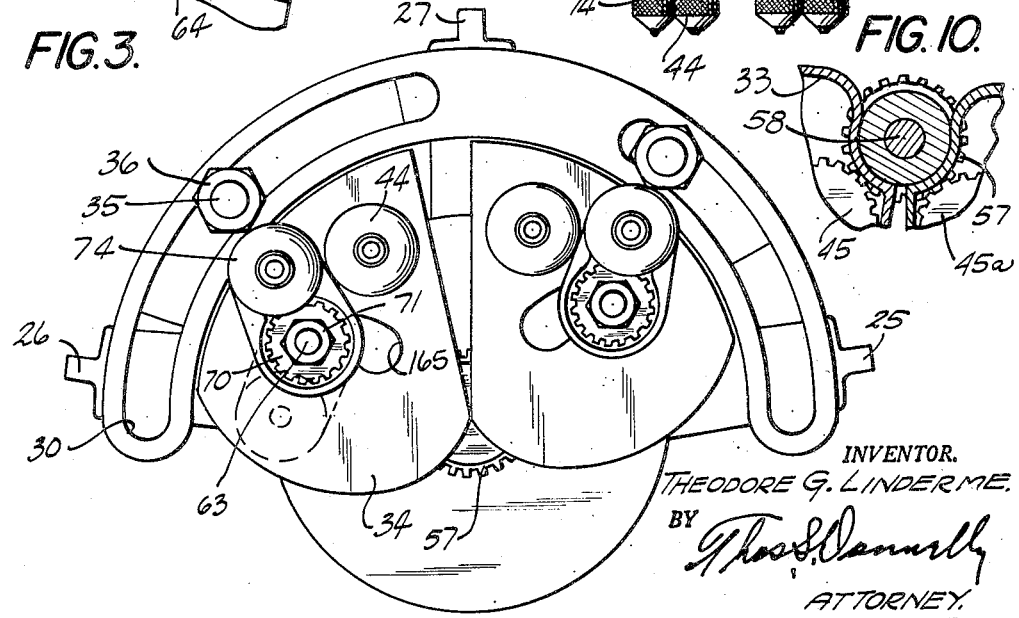
INVENTOR.
THEODORE G. LINDERME.
BY
ATTORNEY.

March 7, 1950  T. G. LINDERME  2,499,657
DRILL HEAD
Filed May 26, 1947  2 Sheets-Sheet 2
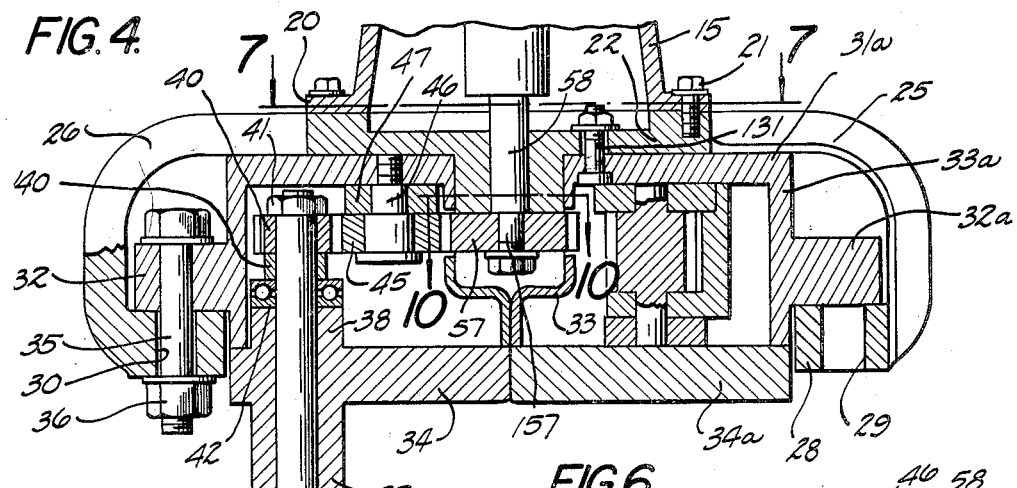
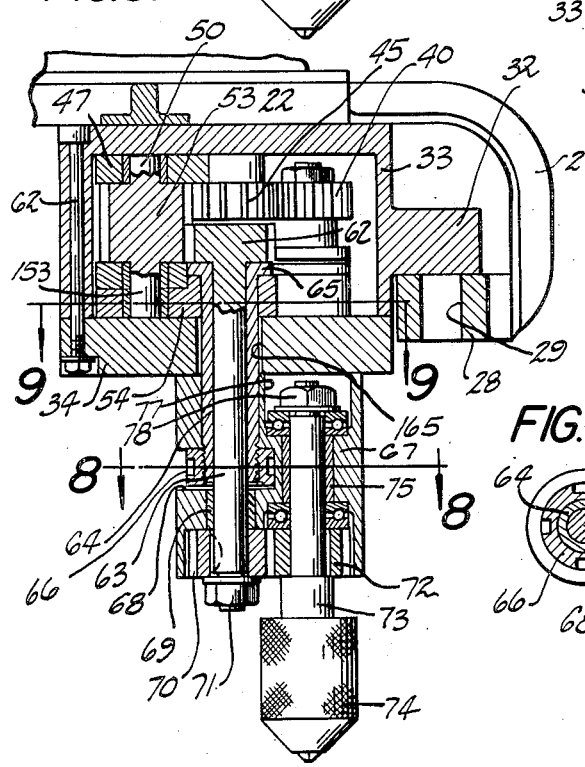
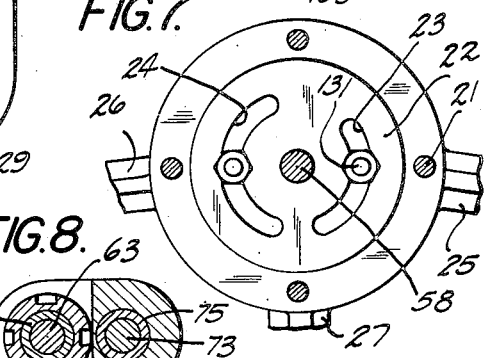
INVENTOR.
THEODORE G. LINDERME.
BY
Thos S Donnelly
ATTORNEY.

Patented Mar. 7, 1950

2,499,657

UNITED STATES PATENT OFFICE 2,499,657

DRILL HEAD

Theodore G. Linderme, Detroit, Mich.

Application May 26, 1947, Serial No. 750,410

2 Claims. (Cl. 77—24)

My invention relates to a new and useful improvement in a drill head and particularly that type which is known as a multiple drill head. The invention involves a drill head having a single driving power or source and so constructed and arranged that a plurality of drills may be driven.

It is an object of the present invention to provide a drill head of this class so arranged and constructed that the various parts may be adjusted to various positions to space the drills apart various distances and at different relative locations.

Another object of the invention is the provision of a construction whereby a plurality of drills may be adjusted to lie parallel to each other and spaced apart varying distances depending upon the distances apart of the holes to be drilled.

Another object of the invention is the provision in a drill head of this class of a pair of relatively movable housings which may be moved around the common center and each of which contains mechanism which may be moved relatively to the housing for effecting the location and spacing of the drills and provided with mechanisms exterior of the housing which may be moved to also affect the location and spacing of the drills.

Another object of the invention is the provision in a drill head of this class of a pair of relatively movable housings each supporting a drill driving member and each supporting a movable drill driving member which may be moved to various positions relatively to the drill driving member on the housing and which may be moved to lie at either side so that the drill driving member supported by the housing may be positioned adjacent each other or they may be spaced apart and the movable members carried by the housing positioned adjacent each other to lie between the ones carried by the housing.

Another object of the invention is the provision of a drill head of this class which will enjoy great flexibility and in which a multitude of adjustments may be made.

Another object of the invention is the provision of a drill head of this class which will be light, economically manufactured, easily and quickly operated and adjusted, and highly efficient in use.

Other objects will appear hereinafter.

It is recognized that various modifications and changes may be made in the detail of structure illustrated without departing from the invention itself and it is intended that such shall be embraced within the scope of the claims which form a part hereof.

Forming a part of this specification are drawings in which,

Fig. 1 is a side elevational view of the invention,

Fig. 2 is an enlarged sectional view taken on line 2—2 of Fig. 1,

Fig. 3 is an enlarged bottom plan view of the invention,

Fig. 4 is a sectional view taken on line 4—4 of Fig. 2,

Fig. 5 is a fragmentary, sectional view taken on line 5—5 of Fig. 2,

Fig. 6 is a fragmentary, sectional view taken on line 6—6 of Fig. 2,

Fig. 7 is a fragmentary view slightly reduced in size taken on line 7—7 of Fig. 4, Fig. 8 is a sectional view taken on line 8—8 of Fig. 5, Fig. 9 is a sectional view taken on line 9—9 of Fig. 5, Fig. 10 is a fragmentary, sectional view taken on line 10—10 of Fig. 4.

In the drawings I have illustrated the invention comprising a neck 15 split at 16 and provided with the outwardly projecting lugs 17 and 18 through which is extended a bolt to secure the body 15 to the stationary member 61 of a drill press. Through the member 61 extends the rotatable spindle 58. The body 15 is provided with the outwardly projecting flange 20 which is secured by means of the bolts 21 to the disc 22 which serves as a support for the drill head housing. Extending outwardly from this disc 22 are the arms 25, 26 and 27 which are connected to and serve to support the arcuate plate 28 in which are formed the spaced apart arcuate slots 29 and 30, as clearly shown in Fig. 2. Formed in the disc 22, as shown in Fig. 7, is a pair of oppositely disposed arcuate slots 23 and 24 and through each of these slots is extended a bolt 131. A pair of these bolts is provided and each bolt is arranged to secure a housing to the disc 22. These housings are clearly shown in Fig. 2 and in Fig. 3 and the construction and arrangement of each of the housings is the same so that a description of one will suffice for both. However, the housing to the right of Fig. 4 is designated in its various parts, with the numbers followed by the letter "a" and these numbers correspond to the numerals used to designate the various parts of the housing to the left of Fig. 4 so that when the numeral is applied to one housing, it will be applicable to the other housing. Each housing is provided with a top 31 and a side wall 33 extending outwardly from which is a flange 32. Extended through an opening in the flange 32 is a bolt 35 which passes through the arcuate slot 30 or 29 as the case may be. Threaded on this bolt 35 is a nut 36 which, when tightened, will prevent the swinging of the housing relatively to the arcuate slot through which the bolt 35 projects. A bottom 34 is provided for each of the housings and held in position by the stay bolts 62 shown in Fig. 5. Projecting downwardly from the bottom 34, at one location, is a neck 37 in alignment with the inwardly projecting neck 38 to provide a bearing for the spindle 39 which rotatably projects therethrough. A gear 40 is mounted on the spindle 39 for rotation in unison therewith and a nut 41 is threaded on the spindle 39 to retain the gear 40 pressed against the spacer 140 which bears against the thrust bearing 42. This nut 41 also serves to retain the shoulder on the spindle 39 engaged in the thrust bearing 43 and on the end of the spindle 39 is a suitable collet or chuck 44 which will serve as a means for fastening a drill so as to project outwardly in the usual manner.

The gear 40 meshes with a gear 45 mounted on the stud 46 which is secured to the top 31 and which projects through the upper plate 47 of a U-shaped bracket which has the vertically directed portion 48 and the lower portion 49, clearly shown in Fig. 6. Threaded into the upper plate 47 of the U-shaped bracket is a stud 55 which extends through an arcuate slot 56 formed in the top 31 of the housing, as shown in Fig. 6 and Fig. 2, so that the U-shaped bracket may swing on the member 46 as a pivot within the limits of the arcuate slot 56 when the screw 55 is unthreaded so as to prevent binding. A gear 53 is provided on its opposite ends with the trunnions 50 which engage in bushings 51 and 52 positioned in openings formed in the plates 47 and 49, respectively. This gear 53 meshes with the gear 45 and the trunnion 50 and the lower trunnion 153 at the lower end of the gear projects through a plate 54. This plate 54 is adapted to swing on the axis of trunnion 153 within certain limits and will be explained later.

Mounted on the driving spindle 157 so as to rotate in unison therewith is a gear 57, the member 157 being driven by the spindle 58 which extends through the inwardly projecting neck 59 formed on the disc 22 (see Fig. 4).

As shown in Fig. 5, the gear 53 meshes with a gear 62 formed to rotate in unison with the spindle 63 which extends through the bushing 64 having a flange 65 formed at its upper end and resting on the upper face of the plate 54. This bushing or sleeve 64 projects through the arcuate slot 165 formed in the bottom 34. This arcuate slot is clearly shown in Fig. 9. This sleeve or bushing 64 projects through an opening formed in the block 67 and threaded on the lower end of the bushing or sleeve 64 is a nut 63 which serves, upon being tightened, to clamp the block 67 in fixed relation to the bottom 34. This nut 66 fits in a pocket 68 formed in the block 67. The spindle 63 projects beyond the end of the bushing or sleeve 64 and through a bushing 69 mounted in the block 67. As shown in Fig. 5, this block is provided at its lower end with a recess through which the spindle 63 projects. Mounted on the spindle 63 and positioned within the recess is a gear 70 which rotates in unison with the spindle 63 and which is held in position by means of the nut 71. This gear 71 meshes with the gear 72 mounted on the spindle 73 for rotation in unison therewith. This spindle 73 carries at its lower end the chuck or collet 74 which serves as an attachment for a drill. The spindle 73 is journaled in a bushing 75 mounted in the block 67 and projects into the recess or pocket 77 formed in the upper face of the block 67. A nut 78 is threaded upon the upper end of the spindle 73 and adapted to bear against the thrust bearing 77 and retain the gear 72 bearing against the lower thrust bearing 177. The construction is such that when the gear 57 is rotated, the gear 53 will also be rotated to effect a rotation of the spindle 63 and thereby a rotation of the spindle 73 while, at the same time, the spindle 39 will be rotated to the gears 45 and 40.

From the description thus far given, it will be seen that each of the housings may be swung relatively to each other on the axis of the member 46 shown on Fig. 4. In Fig. 3, the housing to the left has been swung slightly away from the housing to the right. A swinging movement, of course, cannot be effected until the nut 36 is loosened and as the housing swings it, of course, carries with it the two spindles 39 and 73 which may be termed drill spindles. The drill spindle 73 may be moved relatively to the drill spindle 39. This may be effected in two ways. One way would be to loosen the nut 66 and then swing the entire supporting structure embodying the spindle 63 and the sleeve 64 through the arc 165 which is formed in the bottom 34. In this swinging movement, the plate 54, shown in Fig. 9, would swing on the member 153 as an axis. Another movement may be effected by loosening the nut 71 and the screw 66 and then swinging the block 67 on the spindle 63 as an axis and in this movement, the block 67 may swing entirely around the spindle 63. For instance, should the housing be swung further apart than that shown in Fig. 3 and then the block 67 swung around the spindle 63 as an axis, the spindles 73 may be brought adjacent to each other so as to lie between the spindles 39.

Another movement may be effected also. This has previously been referred to, namely, the swinging of the U-shaped brackets on the stud 46 as an axis. This swinging, of course, is limited by the length of the slot 56, as clearly shown in Fig. 2. In this movement, the plate 54 would shift bodily, together with the sleeve 64 and its associated part, and in Fig. 9 this movement would be downwardly so that the sleeve or bushing 64 would engage the off-set 79 formed in the slot 165.

These various movements become necessary when the device is adjusted to different dimensions and different locations and it is desired to drill a number of holes in alignment. For instance, should the housings, as shown in Fig. 2, be moved toward each other so that the flat faces are substantially in engagement, the chucks 74 would not be in alignment with the spindles of the chucks 44 and by moving toward and into the off-set 79 of the slot 165, this alignment might be effected. Similarly, the plurality of spindles which consist of four in the structure illustrated may always be brought into alignment regardless of the relative spacing of the individual spindles or their position. Consequently, it becomes possible, within the limits of the head, which depends upon the size of the head, to drill the four holes spaced apart any desired position and in alignment with each other. It also becomes possible to drill them at any spacing or relative location within the limits of movement and, consequently, a highly efficient drill head is thus provided. Experience has shown that an operator very quickly becomes accustomed to making the necessary adjustments and swinging the various parts in order to obtain the proper spacing and the proper location of the various drills.

What I claim as new is:

1. A multiple drill head of the class described, comprising: a pair of housings swingable relatively to each other about a common center; means for securing said housings in fixed relation; a plurality of drill spindles mounted on and projecting below each of said housings; means for driving all of said drill spindles simultaneously; and means for adjusting the relative position of said drill spindles in each of said housings.

2. In a multiple drill head of the class described, a pair of housings swingably mounted relatively to each other and swingable about a common axis; a drill driving member carried by each of said housings and projecting downwardly therefrom and in fixed relation thereto; a second drill driving member mounted on each of said housings and projecting downwardly therefrom, said second drill driving member being movable relatively to said housing and adapted for swinging to lie at either side of said stationary drill driving member; and means for driving each of said drill driving members simultaneously.

THEODORE G. LINDERME.

REFERENCES CITED

The following references are of record in the file of this patent:

UNITED STATES PATENTS

| Number | Name | Date |
|---|---|---|
| 1,449,164 | Buhr | Mar. 20, 1923 |